US011907303B2

(12) United States Patent
Singh et al.

(10) Patent No.: US 11,907,303 B2
(45) Date of Patent: Feb. 20, 2024

(54) JOB CANDIDATE LISTING FROM MULTIPLE SOURCES

(71) Applicant: International Business Machines Corporation, Armonk, NY (US)

(72) Inventors: Sudhanshu Shekhar Singh, New Delhi (IN); Kushal Mukherjee, New Delhi (IN); Shweta Garg, New Delhi (IN); Gyana Ranjan Parija, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 16/593,447

(22) Filed: Oct. 4, 2019

(65) Prior Publication Data

US 2021/0103620 A1   Apr. 8, 2021

(51) Int. Cl.
*G06F 16/903* (2019.01)
*G06F 16/9035* (2019.01)
*G06Q 10/1053* (2023.01)

(52) U.S. Cl.
CPC .... *G06F 16/90348* (2019.01); *G06F 16/9035* (2019.01); *G06Q 10/1053* (2013.01)

(58) Field of Classification Search
CPC .......... G06F 16/90348; G06F 16/9035; G06Q 10/1053
See application file for complete search history.

(56) References Cited

U.S. PATENT DOCUMENTS

| | | | |
|---|---|---|---|
| 5,987,446 A | 11/1999 | Corey et al. | |
| 6,327,590 B1 | 12/2001 | Chidlovskii et al. | |
| 9,405,807 B2 | 8/2016 | Obernikhin et al. | |
| 10,147,072 B2 | 12/2018 | Chuang et al. | |
| 2003/0037074 A1 | 2/2003 | Dwork et al. | |

(Continued)

FOREIGN PATENT DOCUMENTS

GB    2556406 A  *  5/2018  ......... G06Q 10/1053

OTHER PUBLICATIONS

Alnur Ali et al., "Experiments with Kemeny ranking: What works when?", Mathematical Social Sciences, 2011, 13 Pages, Elsevier B.V.

(Continued)

*Primary Examiner* — Pierre M Vital
*Assistant Examiner* — Andrew N Ho
(74) *Attorney, Agent, or Firm* — Nathan M. Rau (57) ABSTRACT

One embodiment provides a method, including: receiving a ranked listing of a plurality of candidates; within a first one of a plurality of collaboration rounds: (i) aggregating the ranked listings into an overall listing, (ii) presenting the overall listing to a first one of the job candidate matching agents, and (iii) receiving at least one modification to the overall listing from the agents; (iv) presenting a version of the overall listing to each of the remaining agents; and (v) receiving any modifications from the agents until all of the agents have had a turn; conducting others of the plurality of collaboration rounds: (i) presenting a version of the overall listing and (ii) receiving any modifications from the agents; (iii) presenting a version of the overall listing to each of the remaining agents, and (iv) receiving any modifications from the agents; and providing the final version to a user.

18 Claims, 3 Drawing Sheets

(56) References Cited

U.S. PATENT DOCUMENTS

| | | | |
|---|---|---|---|
| 2003/0105642 A1* | 6/2003 | Andino, Jr. | G06Q 10/105 705/321 |
| 2005/0240457 A1* | 10/2005 | Connally | G06Q 10/06 705/321 |
| 2005/0246299 A1* | 11/2005 | Scarborough | G09B 7/02 706/21 |
| 2007/0011155 A1 | 1/2007 | Sarkar | |
| 2007/0160963 A1* | 7/2007 | Diaz | G09B 7/02 434/219 |
| 2008/0172284 A1* | 7/2008 | Hartmann | G06Q 10/06316 705/7.14 |
| 2010/0131418 A1* | 5/2010 | McCagg | G06Q 10/1053 705/321 |
| 2011/0040749 A1 | 2/2011 | Ceri et al. | |
| 2012/0271675 A1* | 10/2012 | Christensen | G06Q 10/1053 705/7.14 |
| 2013/0065208 A1* | 3/2013 | Glass | G09B 7/02 434/236 |
| 2013/0275323 A1* | 10/2013 | Chuang | G06Q 10/1053 705/321 |
| 2013/0282605 A1 | 10/2013 | Noelting | |
| 2014/0129462 A1* | 5/2014 | Mehta | G06Q 10/063112 705/321 |
| 2014/0129465 A1* | 5/2014 | Baeck | G06Q 10/1053 705/321 |
| 2014/0180947 A1* | 6/2014 | Baeck | G06Q 10/1053 705/321 |
| 2015/0127565 A1* | 5/2015 | Chevalier | G06Q 30/00 705/319 |
| 2017/0178078 A1* | 6/2017 | Fernando | G06Q 10/1053 |
| 2017/0185964 A1 | 6/2017 | Borges et al. | |
| 2018/0150739 A1* | 5/2018 | Wu | G06N 20/10 |
| 2019/0164107 A1* | 5/2019 | Upadhyay | G06Q 10/06398 |

OTHER PUBLICATIONS

Dov Monderer et al., "Potential Games", Games and Economic Behavior, 1996, 20 Pages, Article No. 0044, Academic Press, Inc.

* cited by examiner

JOB CANDIDATE LISTING FROM MULTIPLE SOURCES

BACKGROUND

When a company needs to hire a person for an open position, the company may employ multiple, different job systems to find candidates for the open position. As an example, the company may use an internal system that allows people who already work for the company to see a job posting and apply for the open position. As another example, the company may use an online applicant tracking system that allows people from outside the company to see a job posting and apply for the open position. As a final example, the company may use a proactive system that seeks out potential candidates that have not yet applied for the position. For example, the company may utilize a recruiter who contacts potential candidates to determine if they would be interested in the open position.

Each of the systems or agents working in conjunction with the job system (e.g., recruiters, hiring managers, human resource employees, etc.) may have different criteria for finding a suitable candidate for an open position. For example, one system or agent may place more emphasis on employment history whereas another system or agent places more emphasis on education. Thus, each of these systems or agents may have a unique algorithm that is utilized to rank job candidates for an open position. Based upon this ranking, the system or agent may recommend a particular job candidate or job candidates for an interview or to be hired for the position.

BRIEF SUMMARY

In summary, one aspect of the invention provides a method, comprising: receiving, from each of a plurality of job candidate matching agents, a ranked listing of a plurality of candidates for an open position, wherein each of the ranked listings comprises candidate profiles for a job; within a first one of a plurality of collaboration rounds: (i) aggregating the ranked listings into an overall listing, (ii) presenting the overall listing to a first one of the job candidate matching agents, and (iii) receiving at least one modification to the overall listing from the first one of the agents, wherein the at least one modification reorders the plurality of candidates; and in an analogous fashion, (iv) presenting, in turn, a version of the overall listing to each of the remaining job candidate matching agents, wherein a version presented to an agent comprises a version of the overall listing having any modifications received by an agent having the preceding turn and (v) receiving any modifications from the agents until all of the agents have had a turn; conducting, until a final version of the overall listing is reached, others of the plurality of collaboration rounds, within each of the other rounds: (i) presenting a version of the overall listing corresponding to a version received from the final job candidate matching agent in a previous round, to the first one of the agents and (ii) receiving any modifications from the first one of the agents; and in an analogous fashion, (iii) presenting, in turn, a version of the overall listing to each of the remaining job candidate matching agents, wherein a version presented to an agent comprises a version of the overall listing having any modifications received by an agent having the preceding turn and (iv) receiving any modifications from the agents until all of the agents have had a turn; and providing the final version to a user.

Another aspect of the invention provides an apparatus, comprising: at least one processor; and a computer readable storage medium having computer readable program code embodied therewith and executable by the at least one processor, the computer readable program code comprising: computer readable program code configured to receive, from each of a plurality of job candidate matching agents, a ranked listing of a plurality of candidates for an open position, wherein each of the ranked listings comprises candidate profiles for a job; within a first one of a plurality of collaboration rounds: computer readable program code configured to (i) aggregate the ranked listings into an overall listing, (ii) present the overall listing to a first one of the job candidate matching agents, and (iii) receive at least one modification to the overall listing from the first one of the agents, wherein the at least one modification reorders the plurality of candidates; and computer readable program code configured to, in an analogous fashion, (iv) present, in turn, a version of the overall listing to each of the remaining job candidate matching agents, wherein a version presented to an agent comprises a version of the overall listing having any modifications received by an agent having the preceding turn and (v) receive any modifications from the agents until all of the agents have had a turn; computer readable program code configured to conduct, until a final version of the overall listing is reached, others of the plurality of collaboration rounds, within each of the other rounds: computer readable program code configured to (i) present a version of the overall listing corresponding to a version received from the final job candidate matching agent in a previous round, to the first one of the agents and (ii) receive any modifications from the first one of the agents; and computer readable program code configured to, in an analogous fashion, (iii) present, in turn, a version of the overall listing to each of the remaining job candidate matching agents, wherein a version presented to an agent comprises a version of the overall listing having any modifications received by an agent having the preceding turn and (iv) receive any modifications from the agents until all of the agents have had a turn; and computer readable program code configured to provide the final version to a user.

An additional aspect of the invention provides a computer program product, comprising: a computer readable storage medium having computer readable program code embodied therewith, the computer readable program code executable by a processor and comprising: computer readable program code configured to receive, from each of a plurality of job candidate matching agents, a ranked listing of a plurality of candidates for an open position, wherein each of the ranked listings comprises candidate profiles for a job; within a first one of a plurality of collaboration rounds: computer readable program code configured to (i) aggregate the ranked listings into an overall listing, (ii) present the overall listing to a first one of the job candidate matching agents, and (iii) receive at least one modification to the overall listing from the first one of the agents, wherein the at least one modification reorders the plurality of candidates; and computer readable program code configured to, in an analogous fashion, (iv) present, in turn, a version of the overall listing to each of the remaining job candidate matching agents, wherein a version presented to an agent comprises a version of the overall listing having any modifications received by an agent having the preceding turn and (v) receive any modifications from the agents until all of the agents have had a turn; computer readable program code configured to conduct, until a final version of the overall listing is reached, others of the plurality of collaboration rounds, within each of the other rounds: computer readable program code configured to (i) present a version of the overall listing corresponding to a version received from the final job candidate matching agent in a previous round, to the first one of the agents and (ii) receive any modifications from the first one of the agents; and computer readable program code configured to, in an analogous fashion, (iii) present, in turn, a version of the overall listing to each of the remaining job candidate matching agents, wherein a version presented to an agent comprises a version of the overall listing having any modifications received by an agent having the preceding turn and (iv) receive any modifications from the agents until all of the agents have had a turn; and computer readable program code configured to provide the final version to a user.

A further aspect of the invention provides a method, comprising: receiving a job requisition identifying an open job position within a company; receiving, from each of a plurality of applicant acquisition systems, a number of potential job applicants for the job requisition, each of the potential job applicants having a corresponding profile, and wherein the potential job applicants are ranked by the corresponding applicant acquisition system; creating a consolidated listing of the potential job applicants by combining the potential job applicants received by each of the plurality of applicant acquisition systems into a single job applicant listing; presenting the consolidated listing to each of the applicant acquisition systems in a round robin format, wherein, during a turn of the applicant acquisition system, the applicant acquisition system makes any modifications to reorder the potential job applicants within the consolidated listing and wherein a version of the consolidated listing is presented to the next applicant acquisition system in turn; and generating, upon reaching a final ranking of the potential job applicants between the applicant acquisition systems, a final overall listing of the potential job applicants having the final ranking.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Different talent acquisition systems (e.g., internal systems, online applicant tracking systems, proactive acquisition systems, etc.) may have different techniques for obtaining job applicants for an open position. For example, an internal system allows for people already working within the company to see the open position and apply for it. As another example, an online applicant tracking system allows for a wide range of people outside the company to see the open position and apply for it. A proactive acquisition system allows for a direct contact with a possible candidate who may not be actively looking for a new position. Therefore, a company may utilize multiple different talent acquisition systems when the company has a job opening. This allows the company to get the largest number of possible applicants and, presumably, hire the best candidate for the open position. Each talent acquisition system likely has its own unique algorithm for determining which candidate would be best for an open position. For example, one talent acquisition system may place a higher emphasis on job history, whereas another system may place a higher emphasis on education. Thus, utilizing the multiple different systems may result in multiple lists of ranked job candidates, with each list ranking being based upon different criteria.

The problem with the multiple lists is that it is difficult to determine which candidate(s) from all of the lists would be best to bring in for an interview or to hire for a particular position. Since the algorithms for ranking the candidates are unique to the system and are generally unknown to someone outside the system, it can be difficult to know which system's list may be the best to utilize for hiring for an open position. Additionally, since all of the algorithms are unique, the lists cannot be easily combined into a single list because, even if each candidate is scored, the scoring would be based upon different attributes and factors across each list. Therefore, companies are generally forced to select the top n-candidates from each of the lists to interview or hire for an open position. However, merely selecting the top n-candidates from each list may result in selecting bad candidates or overlooking good candidates. For example, if one talent acquisition system has a list including job candidates that are better suited for the open position than any of the candidates on another list, these candidates may be overlooked since only a predetermined number of candidates were selected.

Another traditional option is to combine the lists into a single list utilizing an algorithm that solves a rank aggregation problem. The problem with this approach is that it is a one-time optimization ranking solution. This means that the resulting aggregate list is not that different than any of the lists that were combined to create the single aggregate list. Additionally, this solution does not take into account that if all of the talent acquisition systems had a view of all the candidates, the talent acquisition systems may rank the candidates, including their own candidates, differently than what is accomplished utilizing the ranking solution.

Accordingly, the techniques and systems as described herein provide a technique for ranking job candidates from multiple job candidate matching agent sources utilizing an iterative collaborative ranking process to generate a final job candidate listing. In response to a job requisition or job opening, the system may employ a plurality of job candidate matching agents/systems, also referred to as talent acquisition agents/systems and applicant acquisition agents/systems. From each of these job candidate matching agents, the system may receive a ranked listing of candidates identified by the job candidate matching agent. The ranked listing may also include job profiles for each of the candidates included on the list. The job profiles may include predetermined information, for example, information agreed upon by all job candidate matching agents including, but not limited to, employment history, education, relevant skills, pay requirements, and the like. Since each job candidate matching agent does not want another agent to be able to contact the job candidate, personal identifying information may be masked within the job profiles.

The system generates a collaborative overall listing of all of the candidates on the lists from the job candidate matching agents. Initially, the system combines all the job candidates from all the lists into a single listing and then provides that listing to all the job candidate matching agents. Each of the job candidate matching agents ranks the candidates included in the single listing. The ranked single listing is then provided to each job candidate matching agent in turn, for example, in a round robin format. During the turn of each job candidate matching agent, the agent modifies the ranking of the listing using the ranking algorithm of the agent. The system utilizes these rankings to modify the overall listing and then provides the modified overall listing to the next agent in turn. Once a final ranking of the candidates is achieved, the system provides the collaborative overall listing to the company or entity having the job requisition. The final ranking is either based upon a consensus of the rankings by the job candidate matching agents or, in the case that a consensus cannot be reached, utilizing a one-time ranking optimization algorithm on the overall listing when no agent was further willing to change rankings.

Such a system provides a technical improvement over current techniques for ranking and selecting job candidates. The described systems and methods provide a technique that allows for collaboration between multiple talent acquisition systems in ranking candidates for a job. All of the systems can provide a listing of job candidates which can then be consolidated into a single list through the collaborative environment described herein. The collaborative environment allows each of the agents to rank the overall list of job candidates, which includes all the job candidates from each list of the talent acquisition systems or agents, to work towards a consensus on how all the job candidates should be ranked. Once a final listing is created, the listing can be provided to a company for selecting job candidates to interview or hire for an open position. This list is better than lists generated using conventional techniques, because the conventional techniques merely perform a one-time ranking optimization in order to consolidate the multiple lists. Thus, rather than having a single list that is only slightly different than any of the individual lists, the described system obtains input from the talent acquisition systems to rank all of the job candidates, resulting in a list where the best candidates across all agents are ranked highest.

Figure 1:
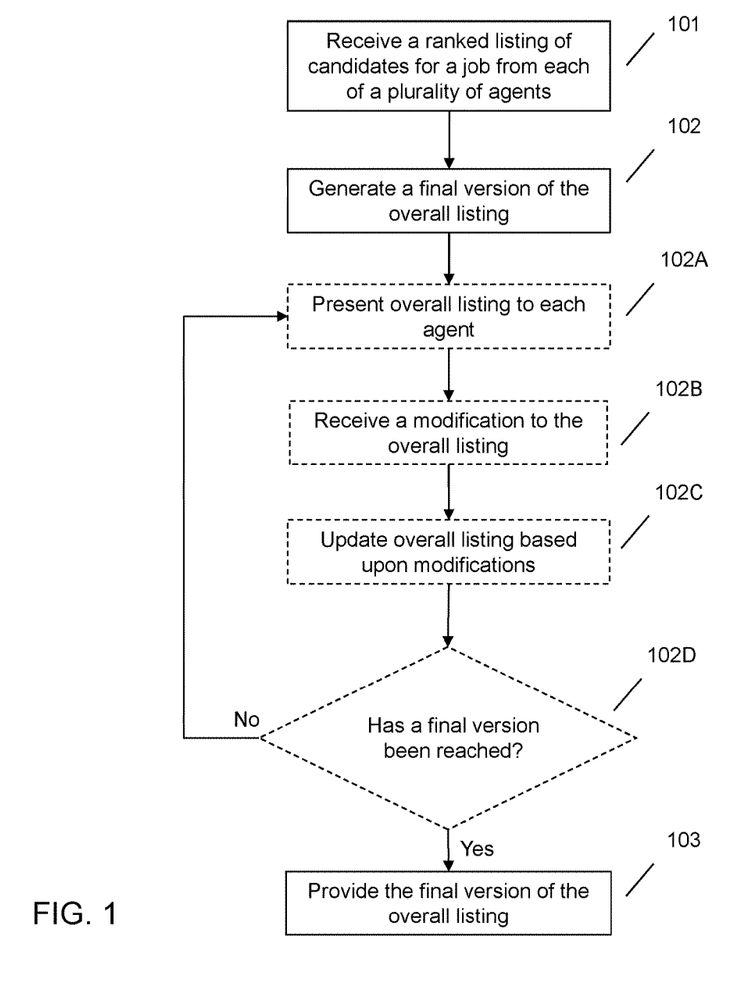
FIG. 1 illustrates a method of ranking job candidates from multiple job candidate matching agent sources utilizing an iterative collaborative ranking process to generate a final job candidate listing.

FIG. 1 illustrates a method for ranking job candidates from multiple job candidate matching agent sources utilizing an iterative collaborative ranking process to generate a final job candidate listing. A company or other hiring entity may provide a job requisition that details an open position. The job requisition may include information related to the open position, for example, details or a description of the open position, requirements of a candidate (e.g., job experience, education, relevant skills, etc.), salary details, a timeframe for hiring a candidate, and the like. The job requisition may be provided to more than one talent acquisition agent so that each of the agents can obtain job candidates for the open position.

The talent acquisition agents may be systems or agents working in conjunction with systems (e.g., hiring managers, recruiters, human resource personnel, etc.) that are utilized to find job candidates for an open position. Example talent acquisition agents and systems include internal systems that are utilized by people already within the company to find open positions within the company, online applicant tracking systems that are utilized by people outside the company and are generally accessed via a network connection, proactive systems that employ a recruiter or other agent that seeks out and directly contacts candidates who may not be actively looking for a new position, and the like.

Once the talent acquisition agents have identified one or more job candidates for the open position, at 101, the system receives a ranked listing of the job candidates from each of the talent acquisition agents. While the talent acquisition agents are generally associated with different talent acquisition systems, some of the talent acquisition agents may be associated with similar talent acquisition systems. For example, the company may employ two different proactive talent acquisition systems. However, each agent has an algorithm that is utilized by the agent to determine which candidates would be best suited for an open position. Utilizing these ranking algorithms, the agent ranks the job candidates, thereby creating a ranked list of the job candidates. The number of candidates included on each listing provided by each agent may be dependent on the historical performance of the agent. For example, an agent who has had job candidates that have ultimately ranked highest in previous collaborative ranking sessions may be allowed to provide more job candidates than another agent who has had low rankings of job candidates. In other words, if an agent is providing better job candidates, that agent may be allowed to provide more job candidates than an agent providing worse job candidates. Thus, each agent may provide a list that has a different number of job candidates than another agent.

The ranked listing of the job candidates also includes job profiles for each of the job candidates. The job profiles may be provided in a particular format that has been agreed upon by the agents or company that has the job requisition. Thus, the job profiles may include particular information that allows each of the agents to identify enough information about the job candidate to rank the candidate when compared with another candidate. The job profiles may include information that allows the agent to determine if the candidate is a good fit for the open position, for example, education history, employment history, relevant or special skills, salary requirements, special requirements, and the like. However, the job profiles may mask personal identifying information that would allow another agent to contact the job candidate, for example, name, phone number, email address, home address, and the like. The personal identifying information is masked to prevent another agent from contacting the job candidate, thereby encouraging the agents to participate in the collaborative job candidate ranking. Since the personal identifying information is masked, two or more agents may include the same job candidate on the list corresponding to the agent and the system will not be able to identify that the same candidate is included on multiple lists. However, this does not cause any detrimental effect to the system and would simply result in job candidates having a tied ranking.

At 102, the system generates a collaborative overall listing of the job candidates by iteratively allowing each agent to rank the job candidates. First, the system generates a single listing of job candidates that is an aggregation of all of the lists provided by the agents. The single overall listing is provided to each of the agents for ranking. Initially the single overall listing may be provided to all of the agents, allowing each of the agents to rank the candidates included in the overall listing utilizing a ranking algorithm unique to the agent. These ranked listings can then be provided to the system, and the system utilizes the ranked listings to create an initial overall listing based upon these ranked lists. For example, the system may utilize a ranking optimization algorithm on all of the lists to generate an initial overall listing. Alternatively, the single overall listing may be provided to one of the agents for an initial ranking.

The system allows the agents to work together in a collaborative environment to rank all of the job candidates identified by the agents. The collaborative environment works in a round robin-type format where each agent has a turn to rank the job candidates included in the overall listing. After the agent has ranked the job candidates the single list is modified based upon the ranking and presented to the next agent in turn. Accordingly, to generate the collaborative overall listing the system iteratively performs steps of presenting the listing to an agent, receiving a ranking from the agent, updating the overall listing based upon the received rankings, and then presenting to the new listing to the next agent in turn.

Accordingly, as a first iteration, the system presents either the initial overall listing, which is based upon all of the agents ranking the job candidates, or the overall listing based upon an initial ranking provided by a single agent, to each of the agents in turn at 102A. The agent utilizes a ranking algorithm to rank the job candidates included in the overall listing. The ranking algorithm may be influenced by a current ranking of the candidates on the listing. In other words, the ranking algorithm may take into account, for example, by weighting, the current ranking of the job candidate(s) when determining a ranking for the job candidate(s). Once the agent has ranked the candidates in the overall listing, the system receives a modified ranking of the overall list from the agent at 102B. At this point, the agent's turn for this round has completed. The system updates the overall listing based upon the modified ranking received by the agent and presents the re-ranked overall listing to the next agent in turn within the round at 102C.

This next agent then performs a ranking of the modified overall listing utilizing a ranking algorithm unique to that agent, provides the ranking to the system, and the system updates the overall listing and presents it to the next agent in turn. This continues until all agents have received a turn to rank the overall listing. After the last agent has ranked the job candidates, that ranking round is over. A new ranking round can then begin, starting with the agent having the first turn in the previous round. This process continues until a final ranking of the job candidates is reached. Thus, after each round, the system determines whether a final ranking from the agents has been reached at 102D. If a final ranking has not been reached, the system starts another ranking round at 102A.

There are two possible scenarios that lead to a final ranking. The first scenario is that all of the agents reach a consensus on how the job candidates should be finally ranked. The system can determine whether a consensus has been reached by comparing the ranking received from the agent to the ranking that was presented to the agent. If the ranking received from the agent matches the ranking that was presented to the agent, then the agent agrees with the ranking. If all agents agree with the ranking, then a consensus has been reached and the ranking is identified as the final ranking. The second scenario is that no agent is willing to compromise or change the ranking. In this case, the agent will continue to provide the same ranking for each round. To determine that the agent is providing the same ranking, the system can compare the ranking received by an agent in one round with a ranking received by the same agent in a different round. If all of the agents continue to provide the same rankings over multiple rounds, then the system determines that no further compromise will be made with respect to the rankings. Accordingly, to reach the final ranking, the system may employ a ranking optimization algorithm and utilize this algorithm on the last overall listing that was created. The resulting listing generated by use of this algorithm will be identified as the final ranking.

Once the final ranking has been reached at 102D, the collaborative overall listing now includes all of the job candidates, from all of the agents, ranked in a single listing. This collaborative overall listing can now be provided to a user, for example, the company or entity that provided the job requisition, at 103. The collaborative overall listing may also be filtered before being presented to the company or entity. For example, the company or entity may only be presented with the top n-candidates from the overall listing instead of the entire listing. The collaborative overall listing can also be utilized to generate a reputation score for each job candidate matching agent. The reputation score can be utilized to determine which agent is providing the best job candidates and, therefore, how many job candidates the agent can provide for the initial listing in subsequent collaborative rankings.

The reputation score may be calculated based upon a historical final ranking of job candidates that were provided by an agent. In other words, an agent whose job candidates were ranked 1-5 in the collaborative overall listing would end up with a higher reputation score than an agent whose job candidates were ranked 10-15. As should be understood, this is merely illustrative as it is more likely that the rankings of an agent's job candidates would be more spread out across the collaborative overall listing. To generate the reputation score utilizing the final job candidate rankings, the system may utilizing a rank distribution of the ranking numbers normalized to 1.

The reputation score may also be based upon feedback received by the company providing the job requisition. For example, the company or entity that provided the job requisition may interview or hire one or more of the job candidates. Based upon the interaction with the job candidate, the company may determine whether the job candidate was actually a good job candidate. This feedback can be utilized in determining the reputation score for an agent. For example, if the feedback is that the job candidate was a good candidate, then the reputation score may be increased. On the other hand, if the feedback is that the candidate was a bad candidate, the reputation score may be decreased.

Each agent may also have other indicators that may affect either the number of job candidates that the agent can provide or other factors during the ranking process. For example, an agent may have coefficients that affect the weighting of the rankings provided by the agent. One coefficient may be a selfishness or non-compromising coefficient. This coefficient may indicate whether the agent is willing to compromise in order to reach a final ranking. An agent who is unwilling to compromise may have a higher selfishness coefficient. This coefficient may cause the weighting of the ranking of the agent to be lower as compared to other agents. The weighting may result in a higher likelihood of a consensus being reached, since the agent whose less willing to compromise has lower influence on the final ranking of the job candidates.

Figure 2:
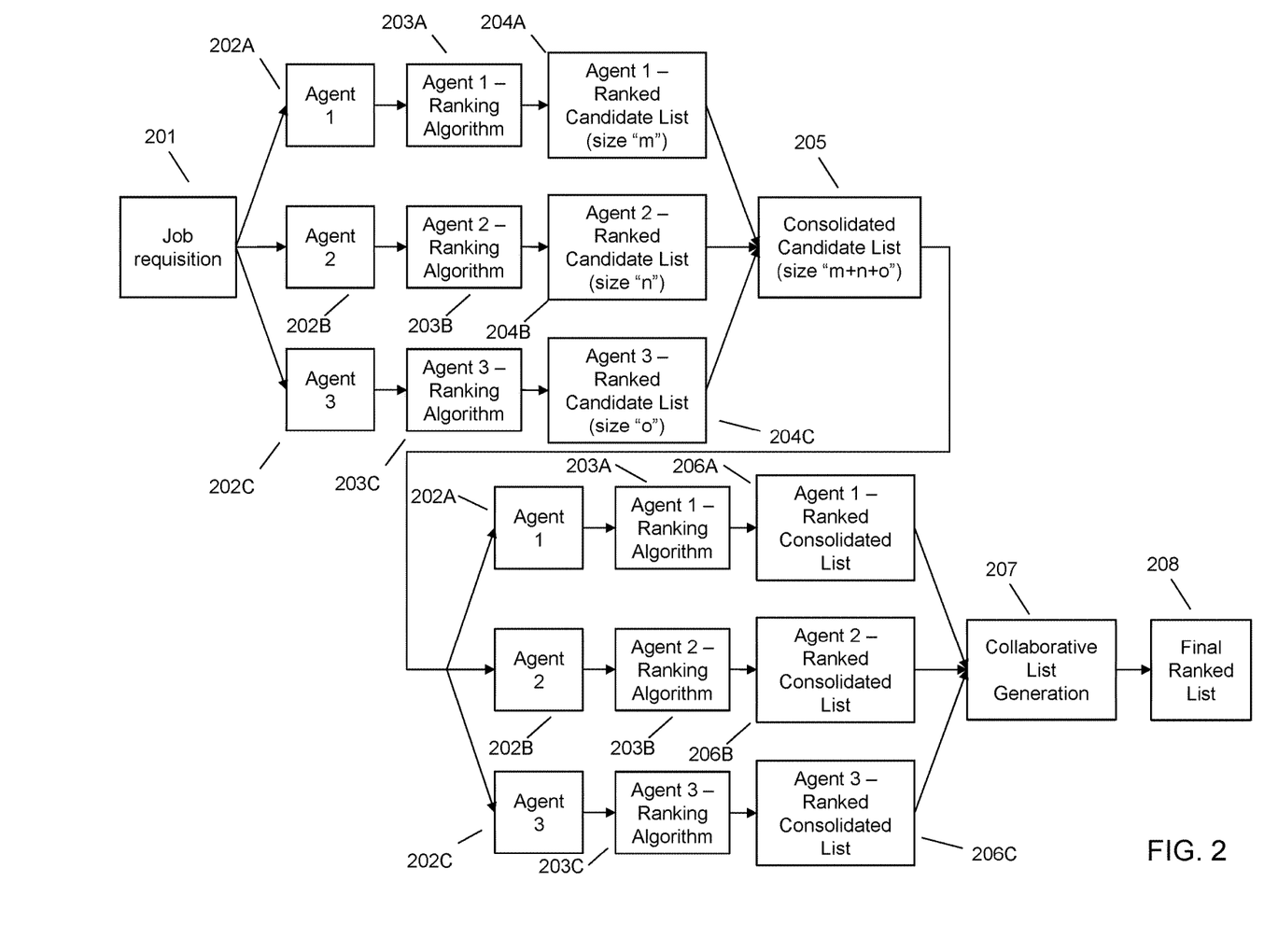
FIG. 2 illustrates a system architecture for ranking job candidates from multiple job candidate matching agent sources utilizing an iterative collaborative ranking process to generate a final job candidate listing.

FIG. 2 illustrates an example system architecture of the overall system. A job requisition 201 is provided to three agents, Agent 1 202A, Agent 2 202B, and Agent 3 202C. Each of these agents finds job candidates and ranks the job candidates utilizing an algorithm unique to the agent 203A, 203B, and 203C. Thus, each agent provides a ranked candidate list, each having a number of candidates or size, 204A, 204B, and 204C. The number of candidates for each agent can be different than other agents. These ranked candidate lists 204A, 204B, and 204C, are consolidated into a single candidate list having a number of candidates or size equal to the sum of the size of the agent lists 205. The consolidated candidate list 205 is then provided back to each of the agents 202A, 202B, and 202C for ranking. The agents 202A, 202B, and 202C, again utilizing a ranking algorithm unique to each agent 203A, 203B, and 203C, rank the consolidated list, thereby creating three ranked consolidated lists, one for each agent, 206A, 206B, and 206C. The system utilizes these three ranked consolidated lists 206A, 206B, and 206C, to create a single listing that is provided to the agents during a collaborative list generation step 207. The collaborative list generation 207 includes rounds where each agent 202A, 202B, and 202C is presented with the overall listing, the agent ranks the candidates on the listing, the system modifies the listing based upon the ranking, and the system then presents the modified listing to the next agent in turn. This continues until a final ranking is reached. The final ranking then results in a final ranked list 208 that can be provided to the entity with the job requisition 201.

Thus, the described systems and methods represent a technical improvement over current systems for ranking and selecting job candidates. Instead of relying on a company to merely select a predetermined number of candidates from each list provided by a talent acquisition system, the system provides a technique for making a collaborative overall list. Since the overall list is collaborative, it also gives each of the talent acquisition systems the chance to rank all of the possible candidates for an open position. Thus, the list presented to the company for choosing job candidates is more complete and provides a better ranking of candidates for selection. Accordingly, the system provides a technique for ranking and selecting job candidates that is more robust, complete, and that provides for identification of better job candidates than conventional techniques that merely consolidate the lists into a single list and utilize a one-time ranking optimization algorithm to rank the candidates.

Figure 3:
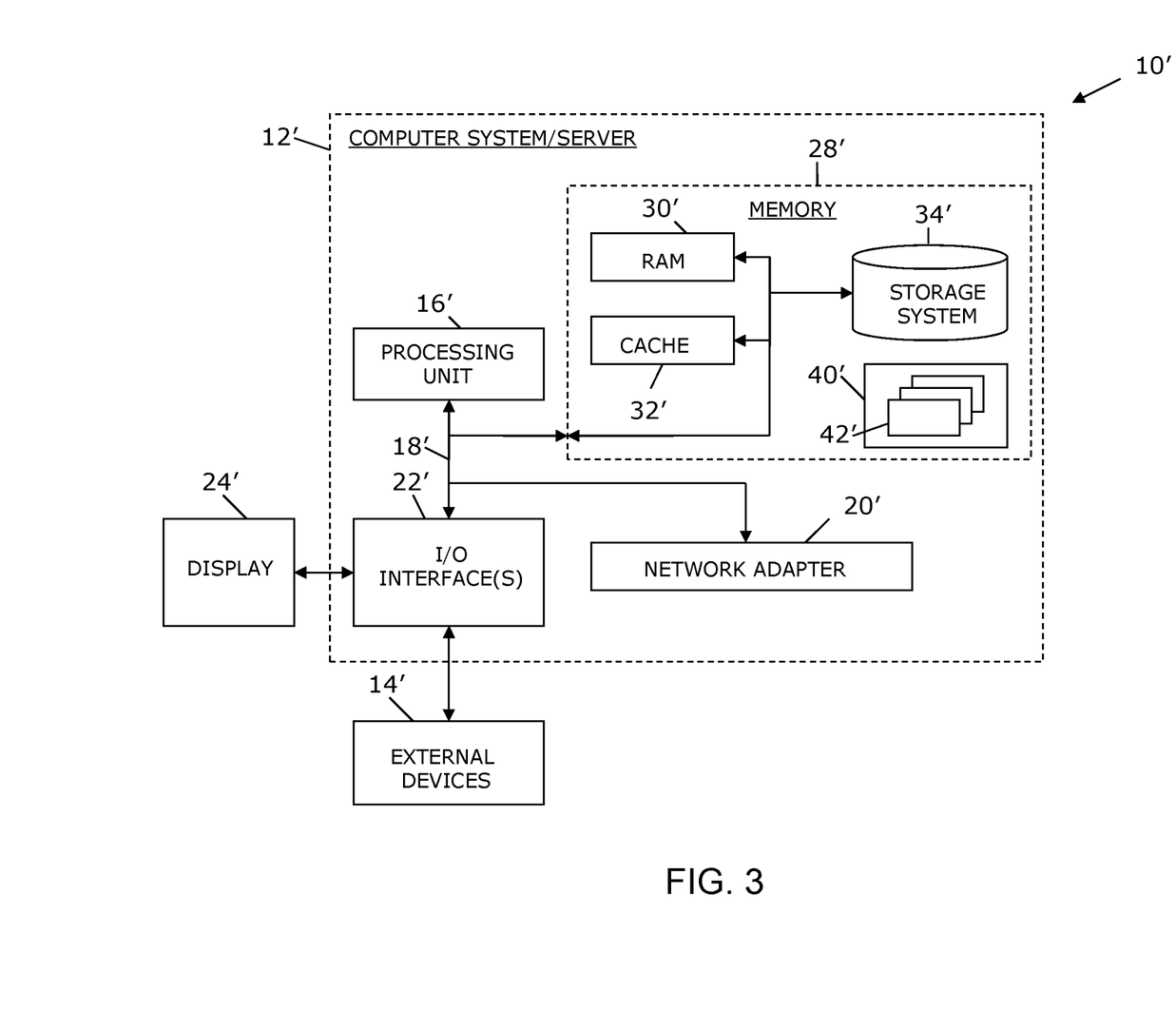
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, at a job candidate acquisition collaboration system and from each of a plurality of job candidate matching agents, a ranked listing of a plurality of candidates for an open position, wherein each of the ranked listings comprises candidate profiles for a job, wherein each of the plurality of job candidate matching agents corresponds to a system that finds job candidates for the open position;
   within a first one of a plurality of collaboration rounds within a collaborative environment within the job candidate acquisition collaboration system, wherein each of the plurality of collaboration rounds is a collaborative ranking round among the plurality of job candidate matching agents, wherein each of the plurality of job candidate matching agents has a corresponding ranking algorithm for ranking job candidates:
   (i) aggregating the ranked listings into an overall listing, (ii) presenting the overall listing to a first one of the job candidate matching agents, and (iii) receiving at least one modification to the overall listing from the first one of the agents, the at least one modification identified using the ranking algorithm of the first one of the job candidate matching agents;
   reordering, by the job candidate acquisition collaboration system, the plurality of candidates based upon the at least one modification; and
   in an analogous fashion, (iv) presenting, in turn, a version of the overall listing to each of the remaining job candidate matching agents, wherein a version presented to an agent comprises a version of the overall listing being reordered based upon the at least one modification received by an agent having the preceding turn within the collaborative ranking round and (v) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents;
   iteratively conducting, within the collaborative environment and until a final version of the overall listing is reached, others of the plurality of collaboration rounds, wherein the final version is identified when the agents make no modifications to a version of the overall listing presented at the beginning of one of the plurality of collaboration rounds, wherein, within each of the others of the plurality of collaboration rounds, the job candidate acquisition collaboration system performs:
   (i) presenting a version of the overall listing corresponding to a version generated, by the job candidate acquisition collaboration system, from modifications received by the final job candidate matching agent in a previous round, to the first one of the agents and (ii) receiving any modifications from the first one of the agents, the any modifications identified using the ranking algorithm of the first one of the agents;
   reordering, by the job candidate acquisition collaboration system, the plurality of candidates based upon the any modifications; and
   in an analogous fashion, (iii) presenting, in turn, a version of the overall listing to each of the remaining job candidate matching agents, wherein a version presented to an agent comprises a version of the overall listing being reordered based upon the any modifications received by an agent having the preceding turn within the collaborative ranking round and (iv) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents; and providing, within the job candidate acquisition collaboration system, the final version to a user.

2. The method of claim 1, wherein the final version is reached via consensus of the job candidate matching agents.

3. The method of claim 1, wherein the final version is reached by utilizing a ranking optimization algorithm.

4. The method of claim 1, wherein the aggregating comprises (i) providing the overall listing to all of the job candidate matching agents for ranking and (ii) consolidating the ranked listings received from each of the job candidate matching agents into the overall listing.

5. The method of claim 1, wherein each of the job profiles is received in a predetermined format agreed upon by the job candidate matching agents.

6. The method of claim 1, wherein the number of job candidates included in the listing is different for each of the job candidate matching agents.

7. The method of claim 6, wherein the number of job candidates for each job candidate matching agent is based upon a reputation score corresponding to the job candidate matching agent.

8. The method of claim 7, wherein the reputation score is calculated based upon a historical final ranking of candidates presented by the job candidate matching agent.

9. The method of claim 1, wherein personal identifying information for each candidate is masked within the job profiles.

10. An apparatus, comprising:

at least one processor; and a computer readable storage medium having computer readable program code embodied therewith and executable by the at least one processor, the computer readable program code comprising:

computer readable program code configured to receive, at a job candidate acquisition collaboration system and from each of a plurality of job candidate matching agents, a ranked listing of a plurality of candidates for an open position, wherein each of the ranked listings comprises candidate profiles for a job, wherein each of the plurality of job candidate matching agents corresponds to a system that finds job candidates for the open position;

within a first one of a plurality of collaboration rounds within a collaborative environment within the job candidate acquisition collaboration system, wherein each of the plurality of collaboration rounds is a collaborative ranking round among the plurality of job candidate matching agents, wherein each of the plurality of job candidate matching agents has a corresponding ranking algorithm for ranking job candidates:

computer readable program code configured to (i) aggregate the ranked listings into an overall listing, (ii) present the overall listing to a first one of the job candidate matching agents, and (iii) receive at least one modification to the overall listing from the first one of the agents, the at least one modification identified using the ranking algorithm of the first one of the job candidate matching agents;

computer readable program code configured to reorder, by the job candidate acquisition collaboration system, the plurality of candidates based upon the at least one modification; and computer readable program code configured to, in an analogous fashion, (iv) present, in turn, a version of the overall listing to each of the remaining job candidate matching agents, wherein a version presented to an agent comprises a version of the overall listing being reordered based upon the at least one modification received by an agent having the preceding turn within the collaborative ranking round and (v) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents;

computer readable program code configured to iteratively conduct, within the collaborative environment and until a final version of the overall listing is reached, others of the plurality of collaboration rounds, wherein the final version is identified when the agents make no modifications to a version of the overall listing presented at the beginning of one of the plurality of collaboration rounds, wherein, within each of the others of the plurality of collaboration rounds, the job candidate acquisition collaboration system comprises:

computer readable program code configured to (i) present a version of the overall listing corresponding to a version generated, by the job candidate acquisition collaboration system, from modifications received by the final job candidate matching agent in a previous round, to the first one of the agents and (ii) receiving any modifications from the first one of the agents, the any modifications identified using the ranking algorithm of the first one of the agents;

computer readable program code configured to reorder, by the job candidate acquisition collaboration system, the plurality of candidates based upon the any modifications; and computer readable program code configured to, in an analogous fashion, (iii) present, in turn, a version of the overall listing to each of the remaining job candidate matching agents, wherein a version presented to an agent comprises a version of the overall listing being reordered based upon the any modifications received by an agent having the preceding turn within the collaborative ranking round and (iv) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents; and computer readable program code configured to provide, within the job candidate acquisition collaboration system, the final version to a user.

11. A computer program product, comprising:

a computer readable storage medium having computer readable program code embodied therewith, the computer readable program code executable by a processor and comprising:

computer readable program code configured to receive, at a job candidate acquisition collaboration system and from each of a plurality of job candidate matching agents, a ranked listing of a plurality of candidates for an open position, wherein each of the ranked listings comprises candidate profiles for a job, wherein each of the plurality of job candidate matching agents corresponds to a system that finds job candidates for the open position;

within a first one of a plurality of collaboration rounds within a collaborative environment within the job candidate acquisition collaboration system, wherein each of the plurality of collaboration rounds is a collaborative ranking round among the plurality of job candidate matching agents, wherein each of the plurality of job candidate matching agents has a corresponding ranking algorithm for ranking job candidates:

computer readable program code configured to (i) aggregate the ranked listings into an overall listing, (ii) present the overall listing to a first one of the job candidate matching agents, and (iii) receive at least one modification to the overall listing from the first one of the agents, the at least one modification identified using the ranking algorithm of the first one of the job candidate matching agents;

computer readable program code configured to reorder, by the job candidate acquisition collaboration system, the plurality of candidates based upon the at least one modification; and computer readable program code configured to, in an analogous fashion, (iv) present, in turn, a version of the overall listing to each of the remaining job candidate matching agents, wherein a version presented to an agent comprises a version of the overall listing being reordered based upon the at least one modification received by an agent having the preceding turn within the collaborative ranking round and (v) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents;

computer readable program code configured to iteratively conduct, within the collaborative environment and until a final version of the overall listing is reached, others of the plurality of collaboration rounds, wherein the final version is identified when the agents make no modifications to a version of the overall listing presented at the beginning of one of the plurality of collaboration rounds, wherein, within each of the others of the plurality of collaboration rounds, the job candidate acquisition collaboration system comprises:

computer readable program code configured to (i) present a version of the overall listing corresponding to a version generated, by the job candidate acquisition collaboration system, from modifications received by the final job candidate matching agent in a previous round, to the first one of the agents and (ii) receiving any modifications from the first one of the agents, the any modifications identified using the ranking algorithm of the first one of the agents;

computer readable program code configured to reorder, by the job candidate acquisition collaboration system, the plurality of candidates based upon the any modifications; and computer readable program code configured to, in an analogous fashion, (iii) present, in turn, a version of the overall listing to each of the remaining job candidate matching agents, wherein a version presented to an agent comprises a version of the overall listing being reordered based upon the any modifications received by an agent having the preceding turn within the collaborative ranking round and (iv) receiving any modifications from the agents and reordering the plurality of candidates after a turn of each of the agents until all of the agents have had a turn, wherein the modifications are identified using the ranking algorithm corresponding to each of the remaining job candidate matching agents, wherein each of the ranking algorithms utilizes a ranking of the plurality of candidates on the presented version of the overall listing to weight each of the plurality of candidates when generating the modifications, wherein a weight of rankings of the plurality of candidates within a modification provided by each of the job candidate matching agents is adjusted utilizing at one coefficient comprising a selfishness coefficient, wherein a higher selfishness coefficient of one of the job candidate matching agents results in a lower weight of the rankings provided by the job candidate matching agents; and computer readable program code configured to provide, within the job candidate acquisition collaboration system, the final version to a user.

12. The computer program product of claim 11, wherein the final ranking is reached via consensus of the job candidate matching agents.

13. The computer program product of claim 11, wherein the final ranking is reached by utilizing a ranking optimization algorithm.

14. The computer program product of claim 11, wherein the overall listing is generated by (i) providing the single listing to all of the job candidate matching agents for ranking and (ii) consolidating the ranked single listing from all of the job candidate matching agents into the overall listing.

15. The computer program product of claim 11, wherein the number of candidates included in the listing is different for each of the job candidate matching agents.

16. The computer program product of claim 15, wherein the number of candidates for each job candidate matching agent is based upon a reputation score corresponding to the job candidate matching agent.

17. The computer program product of claim 16, wherein the reputation score is calculated based upon a historical final ranking of candidates presented by the job candidate matching agent.

18. A method, comprising:
receiving, at a job candidate acquisition collaboration system, a job requisition identifying an open job position within a company;
receiving, at the job candidate acquisition collaboration system from each of a plurality of applicant acquisition systems, a number of potential job applicants for the job requisition, each of the potential job applicants having a corresponding profile, and wherein the potential job applicants are ranked by the corresponding applicant acquisition system, wherein each of the plurality of applicant acquisition systems corresponds to a system that finds job candidates for the job requisition;
creating, at the job candidate acquisition collaboration system, a consolidated listing of the potential job applicants by combining the potential job applicants received by each of the plurality of applicant acquisition systems into a single job applicant listing;
presenting, within a collaborative environment within the job candidate acquisition collaboration system, the consolidated listing to each of the applicant acquisition systems in a round robin format until a final ranking of the potential job applicants is reached, wherein the final ranking is identified when the plurality of applicant acquisition systems make no modifications to a version of the consolidated listing presented at the beginning of one of the plurality of round robin rounds, wherein, during a turn of the applicant acquisition system, the applicant acquisition system makes any modifications to reorder the potential job applicants within the consolidated listing using a ranking algorithm of the applicant acquisition system, the job candidate acquisition collaboration system generates a reranked version of the consolidated listing based upon the modifications and after each of the applicant acquisition system makes any modifications, and the job candidate acquisition collaboration system presents the reranked version of the consolidated listing to the next applicant acquisition system in turn within a round of the round robin format, wherein each round in the round robin is a collaborative ranking round among the plurality of applicant acquisition systems, wherein each of the plurality of applicant acquisition systems has a corresponding ranking algorithm used to rank job applicants, wherein each of the ranking algorithms utilizes a ranking of the potential job applicants on the presented version of the consolidated listing to weight each of the potential job applicants when generating the modifications, wherein a weight of rankings of the potential job applicants within a modification provided by each of the applicant acquisition systems is adjusted utilizing at one coefficient comprising a selfishness coefficient, wherein a higher selfishness coefficient of one of the applicant acquisition systems results in a lower weight of the rankings provided by the applicant acquisition systems; and
generating, within the job candidate acquisition collaboration system and upon reaching the final ranking of the potential job applicants between the applicant acquisition systems, a final overall listing of the potential job applicants having the final ranking.

* * * * *